No. 755,638. PATENTED MAR. 29, 1904.
P. C. DOCKSTADER.
TRANSPORTATION TICKET SYSTEM.
APPLICATION FILED MAR. 11, 1903.
NO MODEL.

No. 755,638.

Patented March 29, 1904.

UNITED STATES PATENT OFFICE.

PRESTON C. DOCKSTADER, OF COLORADO SPRINGS, COLORADO.

TRANSPORTATION-TICKET SYSTEM.

SPECIFICATION forming part of Letters Patent No. 755,638, dated March 29, 1904.

Application filed March 11, 1903. Serial No. 147,320. (No model.)

*To all whom it may concern:*

Be it known that I, PRESTON C. DOCKSTADER, a citizen of the United States, residing at Colorado Springs, in the county of El Paso and State of Colorado, have invented certain new and useful Improvements in Transportation-Ticket Systems; and I do hereby declare the following to be a full, clear, and exact description of the invention, such as will enable others skilled in the art to which it appertains to make and use the same.

This invention, which relates to railroad-tickets, contemplates the production of an improved railroad transportation-ticket adapted for universal use by all railroads and railroad systems, the object of the improvement being the simplification of existing transportation-ticket systems, to lessen the liability of error and fraud, and to reduce the amount of time and labor expended by the agents and other employees in making out, collecting, and checking purchased tickets and in keeping account of tickets in stock.

The nature of my invention will be readily comprehended, reference being had to the following detailed description and to the accompanying drawings, illustrating the invention in its preferred form of embodiment, it being understood that various modifications may be made therein without departing from the spirit of invention defined by the concluding claims.

In the drawings, Figure 1 is a view, centrally broken away, of a railroad transportation-ticket embodying my invention. Fig. 2 is a view of a plurality of sheets bound in book form, certain of the sheets being broken away and containing data for the entries on the ticket. Fig. 3 is a view showing a portion of the ticket containing the necessary entries and punches to render it good for transportation.

My improved ticket in its preferred form consists of a single strip of paper 1, having printed on its upper end portion the name of the issuing railroad, the number of the ticket and designated spaces for the insertion of the destination, and other spaces are provided for "class," "half-fare," and "limit" punches. Two other spaces (respectively numbered 2 3) are provided for the insertion of the "junction" and "route," which terms will be hereinafter explained. This portion of the ticket denoted by the numeral 4 is the "agent's stub" and is so designated, and this stub is connected with a similar stub 5 by a weakened line 6. The stub 5, which is the "auditor's stub," is a duplicate of the agent's stub, with the addition of printed matter directing its transmission to the auditor's office. The auditor's stub is connected by a weakened line 7 with an omnibus-transfer section 8, containing the name of the issuing-railroad, number of the ticket, junction, route, &c., and designated blank spaces for the insertion of the names of the connecting depots. The omnibus-transfer section 8 is connected by a weakened line 9 with the main body 10 of the ticket. It will be understood that in practice the agent's and auditor's stubs are detached by the agent, the remaining portions or sections of the ticket being handed to the purchaser.

The main body of the ticket is printed with the name of the issuing railroad and the number of the ticket and is provided with designated spaces for junction, route, baggage, class of passage, and half-fare, and also with the contract and lines for signatures. It also has designated spaces for the insertion of the destination from the starting-station, which latter is stamped by the agent on the back of the ticket, and also for the name of the final railroad over which the passenger is to travel.

At the right-hand portion of the main body of the ticket is a column of spaces 11 12, respectively containing a plurality of years—as, for instance, "1903" to "1906," inclusive—and the twelve months of a year. To the right of the column of spaces 11 12 are three or more columns of spaces 13 14 15, the spaces of each column being consecutively numbered from "1" to "31," inclusive, representing days of a month. The spaces of the columns 13 14 15 are for the limit and conductor's punches, and in practice the limit-punch in the first column 13 will indicate the day of the month on which the ticket expires, it being understood that proper spaces 11 and 12 will receive limit-punches to indicate the year and month. Inasmuch as a ticket may be presented to more than one conductor in a day's run the additional numbered columns 14 15 are provided to receive successively the punches of the several conductors to whom the ticket is shown. In this way a faithful record is kept of each day's passage of the ticket, and unauthorized stop-overs, which would cause a break in the continuous passage, are thereby readily detected. By this means also any failure on the part of a conductor to examine the ticket is made apparent by the absence of the punch perforation. Further, the unlawful transfer of a ticket from the purchaser to another, either directly or through an agent, may be more quickly and certainly detected where such transfer involves delay and causes a break in the continuous passage of the ticket. An "A. M." and "P. M." record may be kept by the use, for instance, of "A" and "P" punches.

Connected to the main body of the ticket by weakened lines 16 17 18 are three ticket-sections 19, 20, and 21 for other transportation companies over whose lines the ticket is good for passage. Obviously the number of sections will be diminished or increased, dependent upon the destination and route of travel and the number of railroads in said route. Each section contains the name of the issuing railroad, the number of the ticket, reference to the contract on the main body of the ticket, a space for the insertion of the destination from the starting-station stamped on the back, and designated spaces for limiting, half-fare, and class punches, and for the junction and route, also a space for the insertion of the name of the railroad over which the section is good for passage. It will be understood that the sections form an integral part of the whole ticket and are successively detached by the conductors of the lines inserted in the sections. Each part of the ticket, including the stubs, is stamped on the back by the agent with the station-dater.

In filling in or completing a purchased ticket according to the route selected by the purchaser the agent supplies at the spaces 2 3 characters representing the junction which is a terminal of the issuing railroad and the route which is the selected foreign line or lines leading from the junction. The junction may, as shown in Fig. 3, be represented by a letter and the route by a number—as, for instance, "A" and "2." The junction-letter and route-number represent the key to the various railroads over which the passenger travels to his or her destination, and in completing the ticket the agent is guided by what I term the "key-book," (shown in Fig. 2,) which is comprised of a number of sheets preferably bound together and each containing at its top proper instructions for the issue of tickets from stations on a railroad—in this instance "The Colorado Springs Ry."—to any station on each terminal railroad named in the list which is printed below and with which the issuing line has an agreement to sell through tickets. By reference to the portion of the sheet or page 22 it will be seen that each railroad in the list has a distinguishing number, the route embracing Central Railroad of New Jersey, Baltimore and Ohio Railroad, and Philadelphia and Reading Railroad, being numbered "2," and the junction, "Chicago," being lettered "A" for a single trip and "AA" for a round trip. Assuming, therefore, that the ticket shown in Fig. 3 is issued from a station on the Colorado Springs Railway to New York city via Chicago, the junction of the initial line, the several portions of the ticket will be stamped on the back with the dates at the starting-station; the destination will be entered on the face of the main body, stubs, and sections; the junction-letter and route-number will be entered at the provided places; entries of the intermediate railroads will be made on the intermediate sections 19 and 20, it being understood that the name of the issuing line will be printed on the lowermost section 20; the class and limit spaces will be punched, and upon the signing of the contract the ticket becomes good for passage from the starting-station to New York city via Chicago and over the described route. The sheet or page 23 contains a plurality of numbered routes from any station on the Colorodo Springs Railway to a destination via Kansas City, which junction may be lettered "B." It will be understood that for convenience the sheets or pages will be indexed according to the junction-letter or in any other manner which will facilitate reference. Also the arrangement of the punch-spaces on the sections is such as to effect the punching of the sections simultaneously in the folded condition of the latter, and this feature may also be carried out in the agent's and auditor's stubs and the omnibus-transfer section.

It will be observed that the sections 19 20 21 are each a duplicate of the other, with the exception that on the lowermost section 21 is printed the name of the issuing line. The ticket as a whole is adapted for universal use on all railroads and over all routes for a single trip. For round trips the same general plan of ticket is employed, the ticket being completed in the same manner as the single-fare ticket according to the directions given in the key-book sheets or pages, except that the return-sections are to be stamped by agent at destination for return-passage, as per instructions in contract, the junction-points being designated by a double letter, or this plan may be modified without departing from the spirit of the invention. The sections each constitute a condensed copy of the main body of the ticket and are commonly numbered, thus facilitating the work.

The sheets or pages of the key-book are preferably arranged alphabetically as to the terminal railroad of each route, with a plurality of sheets or pages to each letter. Blank sheets or pages may be inserted for the addition of new routes, and, if desired, additional columns may be provided for special tickets issued on circular authority from the railroad for excursions, conventions, &c., either single or round trip. It will be understood that in the event of the issuance of a special ticket the foreign lines are furnished with key-sheets giving the necessary information with reference thereto. The key-book will contain full instructions as to the use of the system.

To discourage counterfeiting and unlawful modification of a completed ticket, thin safety-paper may be employed, on which the matter is engraved, and the necessary entries may be made by a pyrographical tool or other safety appliance.

I claim as my invention—

1. A railroad transportation-ticket having its main body bearing matter rendering it good for passage, and a plurality of similar sections detachable from each other and from said main body, the main body and said sections having thereon designated spaces for the insertion of the destination and junction and route characters, and each section having a designated space for the insertion of the name of the railroad over which said section is good for passage, in combination with key-sheets having names or abbreviations of junctions and routes, said sheets also having thereon characters associated with the names of the respective routes.

2. A railroad transportation-ticket bearing matter rendering it good for passage, a plurality of similar sections detachable from each other and from said main body, agent's and auditor's stubs and omnibus-transfer section detachably connected to said ticket, said main body, stubs and sections bearing the same number and having designated spaces for the insertion of a junction-letter and route-number and of the destination, said similar sections having designated spaces for the insertion of the railroad over which the section is good for passage, in combination with a key-book containing a plurality of pages each containing a lettered junction and a plurality of numbered routes leading from said junction, the matter on the pages being alphabetically arranged.

In testimony whereof I affix my signature in presence of two witnesses.

PRESTON C. DOCKSTADER.

Witnesses:
W. T. NORTON,
T. L. JENKINS.